United States Patent
Eigel (10) Patent No.: US 10,907,973 B2
(45) Date of Patent: Feb. 2, 2021

(54) PREDICTIVE ROUTING OF A TRANSPORTATION VEHICLE

(71) Applicant: VOLKSWAGEN AG, Wolfsburg (DE)

(72) Inventor: Thomas Eigel, Berlin (DE)

(73) Assignee: Volkswagen AG

( * ) Notice: Subject to any disclaimer, the term of this patent is extended or adjusted under 35 U.S.C. 154(b) by 285 days.

(21) Appl. No.: 16/038,526

(22) Filed: Jul. 18, 2018

(65) Prior Publication Data

US 2019/0025063 A1 Jan. 24, 2019

(30) Foreign Application Priority Data

Jul. 18, 2017 (DE) .......................... 10 2017 212 254

(51) Int. Cl.
| | | |
|---|---|---|
| *G01C 21/30* | (2006.01) | |
| *G06K 9/00* | (2006.01) | |
| *B60W 30/10* | (2006.01) | |
| *B60W 30/165* | (2020.01) | |
| *G01C 21/32* | (2006.01) | |

(Continued)

(52) U.S. Cl.
CPC ............. *G01C 21/30* (2013.01); *B60W 30/10* (2013.01); *B60W 30/12* (2013.01); *B60W 30/165* (2013.01); *B60W 40/072* (2013.01); *B60W 40/114* (2013.01); *B60W 50/0097* (2013.01); *G01C 21/32* (2013.01); *G01C 21/3602* (2013.01); *G06K 9/00798* (2013.01); *B60W 2420/42* (2013.01); *B60W 2530/14* (2013.01);

(Continued)

(58) Field of Classification Search
CPC ..................................................... G01C 21/30
See application file for complete search history.

(56) References Cited

U.S. PATENT DOCUMENTS

| | | | |
|---|---|---|---|
| 2002/0161510 A1 | 10/2002 | Matsuura | |
| 2005/0278112 A1* | 12/2005 | Gern .................... | B60W 40/06 |
| | | | 701/532 |

(Continued)

FOREIGN PATENT DOCUMENTS

| | | |
|---|---|---|
| DE | 102004028591 A1 | 12/2005 |
| DE | 102004028404 A1 | 1/2006 |

(Continued)

OTHER PUBLICATIONS

Search Report for German Patent Application No. 10 2017 212 254.4; dated Feb. 16, 2018.

*Primary Examiner* — Alex C Dunn
(74) *Attorney, Agent, or Firm* — Barnes & Thornburg LLP (57) ABSTRACT

A method and a device for predicting the future course of a roadway for a transportation vehicle driving on a road, wherein the road has a first section, a bend and a second section, and the bend is arranged between the first and the second section. The method determines an approximated course of a road derived from a digital map material using an original clothoid segment, wherein the clothoid segment has a starting point on the first section, an end point on the second section, and the clothoid segment sweeps over the angle defined by the bend between the first and the second section, and continuously corrects the original clothoid segment by subsequent corrective clothoid segments, wherein the corrective clothoid segments take into account the curvature of the route actually traveled by the transportation vehicle after the starting point.

17 Claims, 6 Drawing Sheets

(51) Int. Cl.
  *B60W 30/12*   (2020.01)
  *B60W 40/072*  (2012.01)
  *B60W 40/114*  (2012.01)
  *B60W 50/00*   (2006.01)
  *G01C 21/36*   (2006.01)

(52) U.S. Cl.
  CPC ..... *B60W 2552/30* (2020.02); *B60W 2556/50* (2020.02); *B60W 2556/60* (2020.02)

(56) References Cited

U.S. PATENT DOCUMENTS

2016/0054133 A1* 2/2016 Mizuno ................. G01C 21/20
                                                        701/400
2017/0015316 A1* 1/2017 Sekine ................ B60W 30/045

FOREIGN PATENT DOCUMENTS

| | | |
|---|---|---|
| DE | 102005056211 A1 | 6/2007 |
| DE | 102006038018 A1 | 2/2008 |
| DE | 102006040334 A1 | 3/2008 |
| DE | 102008021381 A1 | 11/2009 |
| DE | 102009047476 A1 | 6/2011 |
| DE | 112014002019 T5 | 12/2015 |
| WO | 2004097453 A1 | 11/2004 |
| WO | 2009074206 A1 | 6/2009 |

* cited by examiner

PREDICTIVE ROUTING OF A TRANSPORTATION VEHICLE

PRIORITY CLAIM

This patent application claims priority to German Patent Application No. 10 2017 212 254.4, filed 18 Jul. 2017, the disclosure of which is incorporated herein by reference in its entirety.

SUMMARY

Illustrative embodiments relate to a method for route guidance of a transportation vehicle with the aid of predictive route data, a corresponding device, and a use of the method.

BRIEF DESCRIPTION OF THE DRAWINGS

Disclosed embodiments are described by reference to the following drawings, in which.

DETAILED DESCRIPTION

Digital maps are currently used in a transportation vehicle in the transportation vehicle's own navigation system mainly for navigation purposes, wherein digital map data are also increasingly being used in transportation vehicle guidance by assistance systems. Thus, for example, an anticipatory ACC system can use such map data to adjust the speed before bends in the road, or to improve a lateral guidance assistance system with the aid of map data. If the digital map data does not match the reality, this can lead to functional restrictions or improper interventions of the assistance systems.

Inside the transportation vehicle, the digital map data of the navigation system is distributed to the various control units of the assistance systems. To reduce the volume of data in the distribution of information, the underlying map material is sampled and approximated by clothoid segments. Because of the limited bandwidth of the transmission a tradeoff must be made between accuracy and look-ahead range, in the sense that a high degree of accuracy allows a short look-ahead distance and a low accuracy allows a broad look-ahead distance. In this situation, it is possible that curvatures in the course of a road are underestimated due to the approximation.

Document WO 2004/0097453 A1 relates to a driver assistance device for transportation vehicles, with a course prediction module and an interface to a navigation system, which supplies information to the course prediction module about the course of the road. In the navigation system, information about the road course is stored on a data medium, such as a CD-ROM or DVD, and the information about the current position of the driver's own transportation vehicle is supplied by a satellite-based positioning system. By using this information, the driving course can be predicted and, in particular, a curved road trajectory can be anticipated before the curve is actually entered. If, however, a driving dynamics parameter such as the yaw rate has an offset, then there will be a constant or gradually drifting difference between the directly measured yaw rate and the yaw rate calculated by the navigation system on the basis of the road curvature. Enduring discrepancies, or those which fluctuate in size, then indicate that information provided by the navigation system about the road course contains errors.

Document DE 10 2009 047 476 A1 relates to a method for determining a cutting trajectory, which enables a transportation vehicle to cut a section of a curve in a road. In this method, information about the curve section is received and the curve section is divided into at least one curve segment with a segment length and a starting curvature, wherein the curve segment is either a straight-line segment or an arc segment or a curve segment, whose curvature is a function of an arc length of the curve segment. A cutting trajectory is then determined from the at least one curve segment, so that the cutting trajectory in a certain point of the curve section has a predetermined offset in relation to a center of the road.

The disclosed embodiments improve and correct the underestimation of the curvature of a road curve based on digital map data.

This is achieved by a method, a device and the use of the method.

The disclosed method for predicting the future course of a road for a transportation vehicle driving on a road, wherein the road has a first section, a bend and a second section, and the bend is arranged between the first and the second section, comprises:
  determining an approximated road course derived from a digital map material using an original clothoid segment, wherein the original clothoid segment has a starting point on the first section, an end point on the second section, and the original clothoid segment sweeps over the angle defined by the bend between the first and the second section,
  continuously correcting the original clothoid segment by subsequent corrective clothoid segments, wherein the corrective clothoid segments take into account the curvature of the route actually traveled by the transportation vehicle after the starting point.

The method performs an online correction of the approximated map data under the assumption that the approximation of the exact map material is shape-preserving. The term shape-preserving is understood to mean that the swept angle of a curve is correct and the starting point and the end point of the approximating clothoid segment match those of the map. This allows the possibility of correcting the curvature ahead when traveling along the clothoid segment.

The first section in the present case is defined as a section of road before the bend under examination, and the second section is defined as a section of road after this bend. The two sections can have different shapes. For example, for a simple curve the sections may be straight line sections arranged before or after the curve. Another option, such as in the case of an S-bend, would be a straight-line section as the first section and the beginning of the second curve as the second section, so that the first part of the S-bend is covered by the definition of the two sections with a curve arranged between them. The same then applies to the second part of the S-bend.

Optionally, the corrective clothoid segments have the starting point and the end point of the original clothoid segment and the corrective clothoid segment sweeps over the angle defined by the curve between the first section and the second section. In addition, the current position of the transportation vehicle is also a component of the respective corrective clothoid segment, i.e., the corresponding clothoid segment for the current position of the transportation vehicle contains the current position.

The curvature of the path already traveled from the starting point may be determined and compared with the curvature of the original clothoid segment. If the curvature of the path already traveled is less than the curvature of the original clothoid segment up to the angle defined by the path traveled, then the size of the curvature ahead for the correction by the corrective clothoid segment is increased for the current position. The curvature of the original clothoid segment is therefore compared with the actual curvature. If the curvatures do not match, assumptions can be made about the future course of the road.

Optionally, the curvature which is actually traveled after the starting point of the original clothoid is determined on the basis of driving dynamics parameters, from measurements of an environmental sensor device and/or from position determinations of the transportation vehicle. Possible driving dynamics parameters are the yaw rate, or, for example, an environmental sensor device can perform a driving lane recognition, which is used as a basis for determining the curvature and/or performing a satellite-based position determination. The actual data thus determined can be used to determine the curvature of the path already traveled.

A forward-looking environmental sensor device may determines the curvature of the section of road located in front of the current position of the transportation vehicle, and the curvature ahead and the end position of the road section ahead are taken into account in determining a corrective clothoid segment. In other words, based on an appropriate environmental sensor device, for the road section ahead, for example, the course of the road markings is determined for the visible range of the environment sensor devices. From the course of the road markings it is possible to determine both the curvature of the road section as well as the position on the road section ahead, at which a change in the curvature starts to occur. From the curvature ahead and the position at which the curvature starts to change, a corrective clothoid segment can be predicted.

Optionally, to determine a corrective clothoid segment the curvature of the path previously traveled and the position of a transportation vehicle traveling ahead after the starting point of the original clothoid segment are taken into account. In this way, by tracking a transportation vehicle traveling ahead the original clothoid can be corrected in a predictive manner.

The disclosed device for predicting the future course of a road for a transportation vehicle driving on a road, wherein the road has a first section, a bend and a second section, and the bend is positioned between the first and the second section, and wherein the device is configured and designed to carry out the method described above, comprises:
 a digital map system,
 an approximation system, which determines from the map data of the map system an original clothoid segment with starting and endpoints for approximating the course of the road,
 a system for determining the actual curvature of the path already traveled by the transportation vehicle after the starting point,
 a system for comparing the actual curvature and the predicted curvature of the original clothoid segment, and
 a system for correcting the original clothoid segment by corrected clothoid segments on the basis of the comparison.

The device may have a system for determining the actual curvature of the path traveled by a transportation vehicle ahead on the future path of the transportation vehicle, wherein the actual curvature of the path traveled by the transportation vehicle ahead is used for comparison with the predicted curvature of the original clothoid segment.

Optionally, the device has a system for determining the actual curvature of a section of the road ahead of specified length. This actual curvature of the road section ahead can be used for comparison with the predicted curvature of the original clothoid segment. Such a system can be implemented, for example, by a camera system, such as is used for driving lane detection.

A disclosed use of the method described above for predicting the route of a roadway takes place in an ACC system and/or a lateral guidance assistance system of the transportation vehicle.

Figure 1:
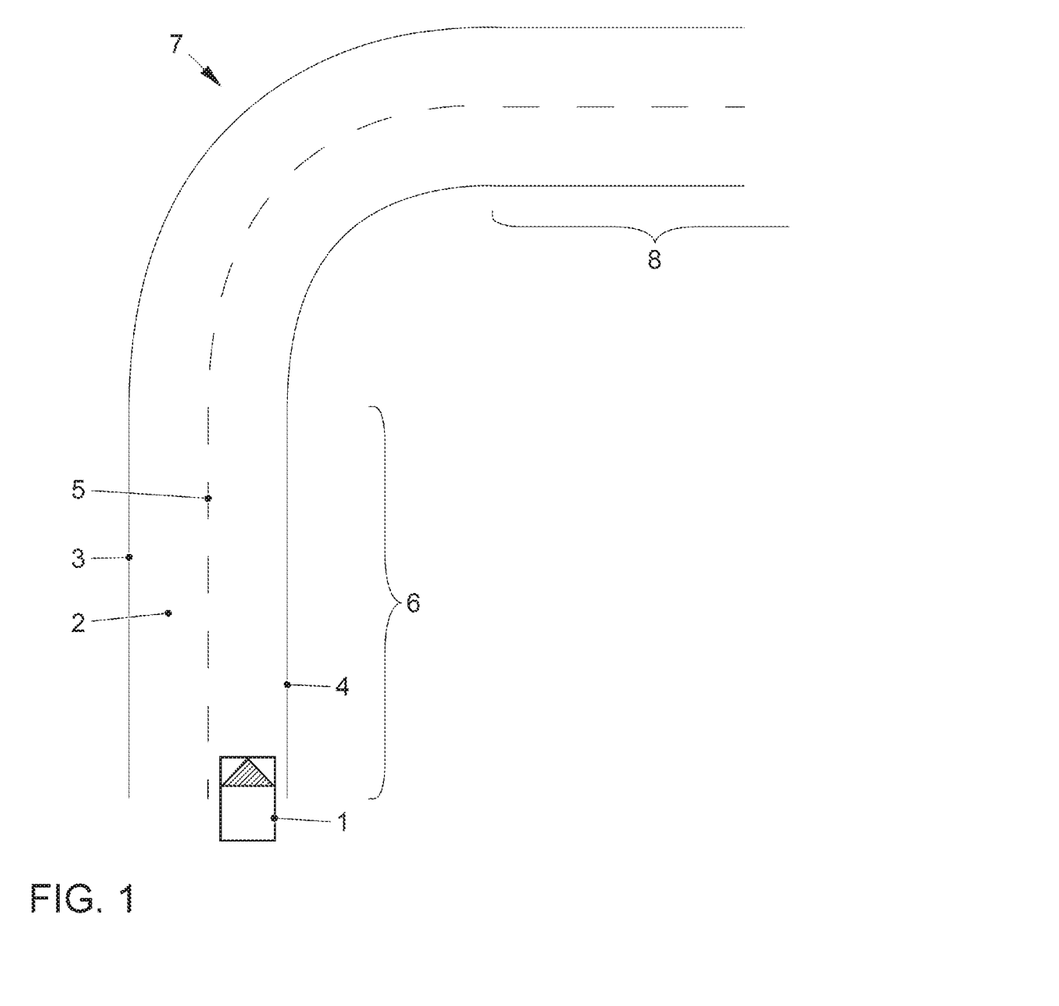
FIG. 1 shows the initial situation of a transportation vehicle far ahead of a bend.

FIG. 1 shows a transportation vehicle 1, which is located on a two-lane highway or road 2, wherein the road 2 is divided into two lanes by side markings 3 and 4 and a center marking 5. The transportation vehicle is located on a first section 6, which in the example of FIG. 1 is realized by a straight section, and is moving towards a bend 7, wherein the transportation vehicle 1 is still some distance from the vertex of the bend, i.e., the apex of the bend. After the bend 7, the road 2 transitions into a second section 8, which in this example is again formed by a straight section.

Figure 2:
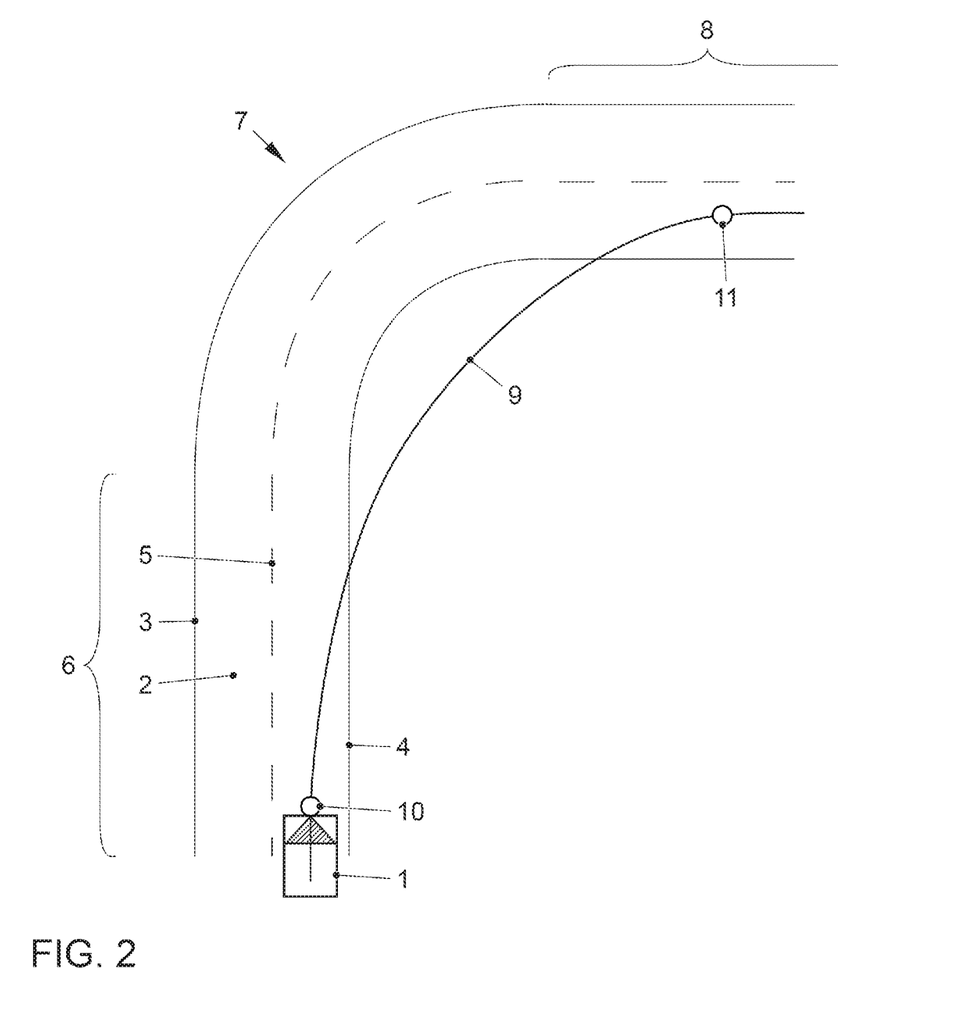
FIG. 2 shows the situation of FIG. 1 with the shape of the bend predicted from map data.

FIG. 2 shows the situation of FIG. 1 with a transportation vehicle 1 on the road 2 before the right-hand bend 7. The real course of the road 2 contained in the digital map material consists of a first section 6, a sharp bend 7 and a second section 8 directly following the bend 7. By the approximation of the road course, a clothoid segment 9 is formed, which starts as early as point 10 on the first section 6 before the bend 7 and stops on the second section 8 after the bend 7 at point 11. The clothoid segment 9 located between the points 10 and 11, which represents the approximation and is hereafter referred to as the original clothoid 9, is clearly more weakly curved than the real bend 7. Due to the lower curvature of the original clothoid 9 which functions as a prediction of the course of the road, this can cause a predictive ACC assistance system to fail to adequately reduce the speed of the transportation vehicle 1 before the bend 7. As a consequence, a lateral guidance system may no longer be able to negotiate the bend 7 independently, due to restricted levels of intervention.

Figure 3:
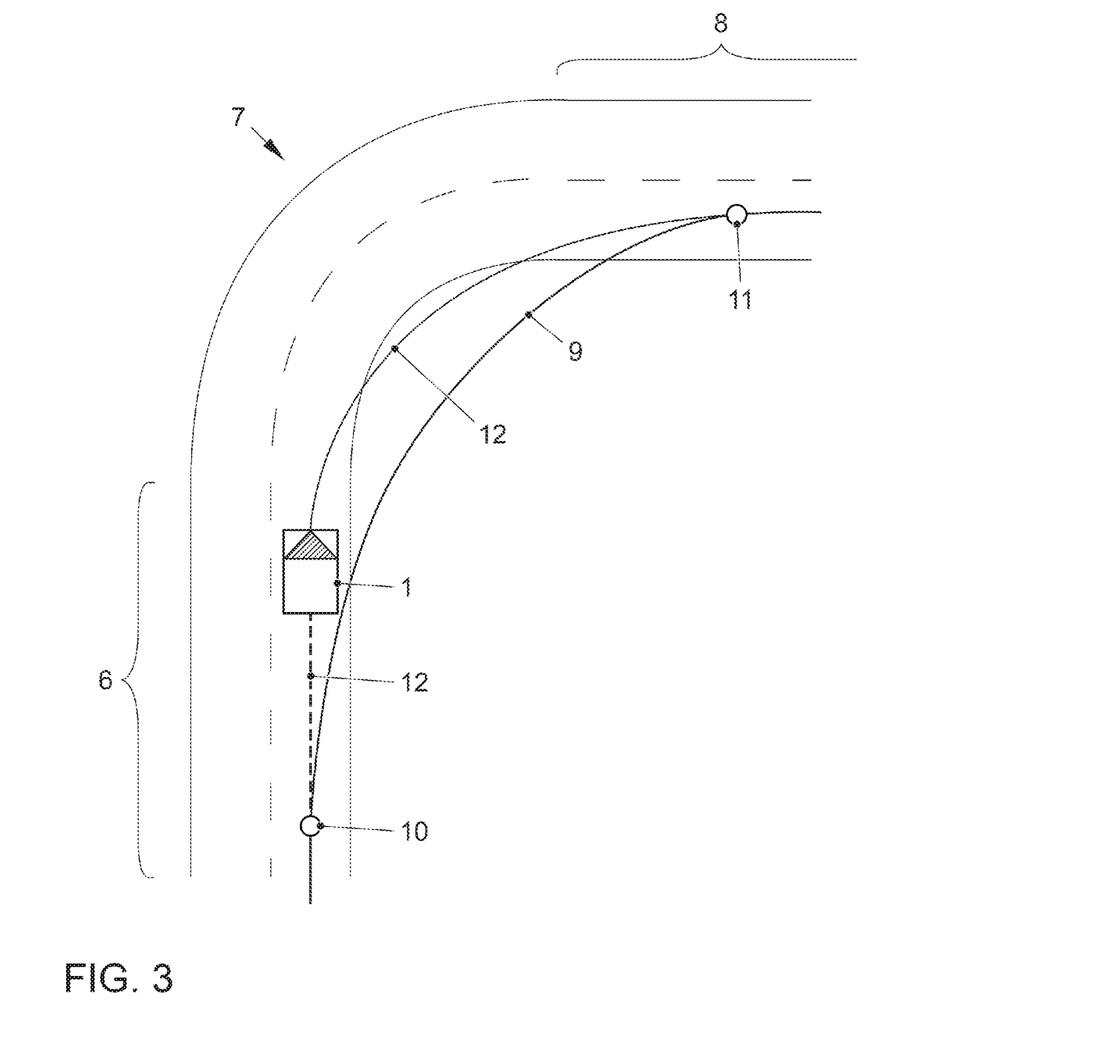
FIG. 3 shows a first correction for the transportation vehicle shortly before the bend.

FIG. 3 shows the further course of the traffic situation of FIG. 2. The transportation vehicle 1, starting from the starting point 10 of the original clothoid 9, has driven further in the direction of the bend 7, but is still on the first section 6 leading up to the bend 7. It is obvious that the transportation vehicle 1 cannot follow the prediction based on the original clothoid 9 due to the actual course of the road. As a result, an online correction of the approximated map data, i.e., the original clothoid 9, is performed.

In doing so, the assumption is made that the approximation of the exact map material by the original clothoid 9 is shape-preserving. In other words, the angle swept through by the curve 7 is correct and the starting and end points 10, 11 of the original clothoid 9 agree with those of the map. In addition, the path traveled by the clothoid 9 represents a lower limit, i.e., the actual driven path of the transportation vehicle 1 through the bend 7 between the points 10 and 11 is greater than or equal to the original clothoid section 9.

This allows the possibility of correcting the curvature ahead while the transportation vehicle 1 is traveling. To this end, the curvature from the original clothoid segment 9 is compared with the actual curvature of the path traveled, which can be effected on the basis of driving dynamics parameters such as the yaw rate, by a lane detection using a camera or environment sensor device and/or position data via GPS. If the curvatures do not match, assumptions can be made about the future course of the road.

In the scenario of FIG. 3, the transportation vehicle 1 is still located on the first section 6 before the bend 7. The original clothoid 9, however, already has an increasing curvature for the angle of the current position of the transportation vehicle. Since the actual driven curvature is less than the predicted curvature, it can be assumed that the size of the curvature ahead needs to be corrected upwards, so that a corrective clothoid segment 12 with starting and end points 10, 11 is obtained, wherein in FIG. 3 the part of the corrective clothoid segment 12 in front of the transportation vehicle 1 is represented as a solid line, while the part of the corrective clothoid segment 12 already traveled is represented as a dashed line. Here the curvature at the apex of the bend, which represents the maximum curvature, is important.

Figure 4:
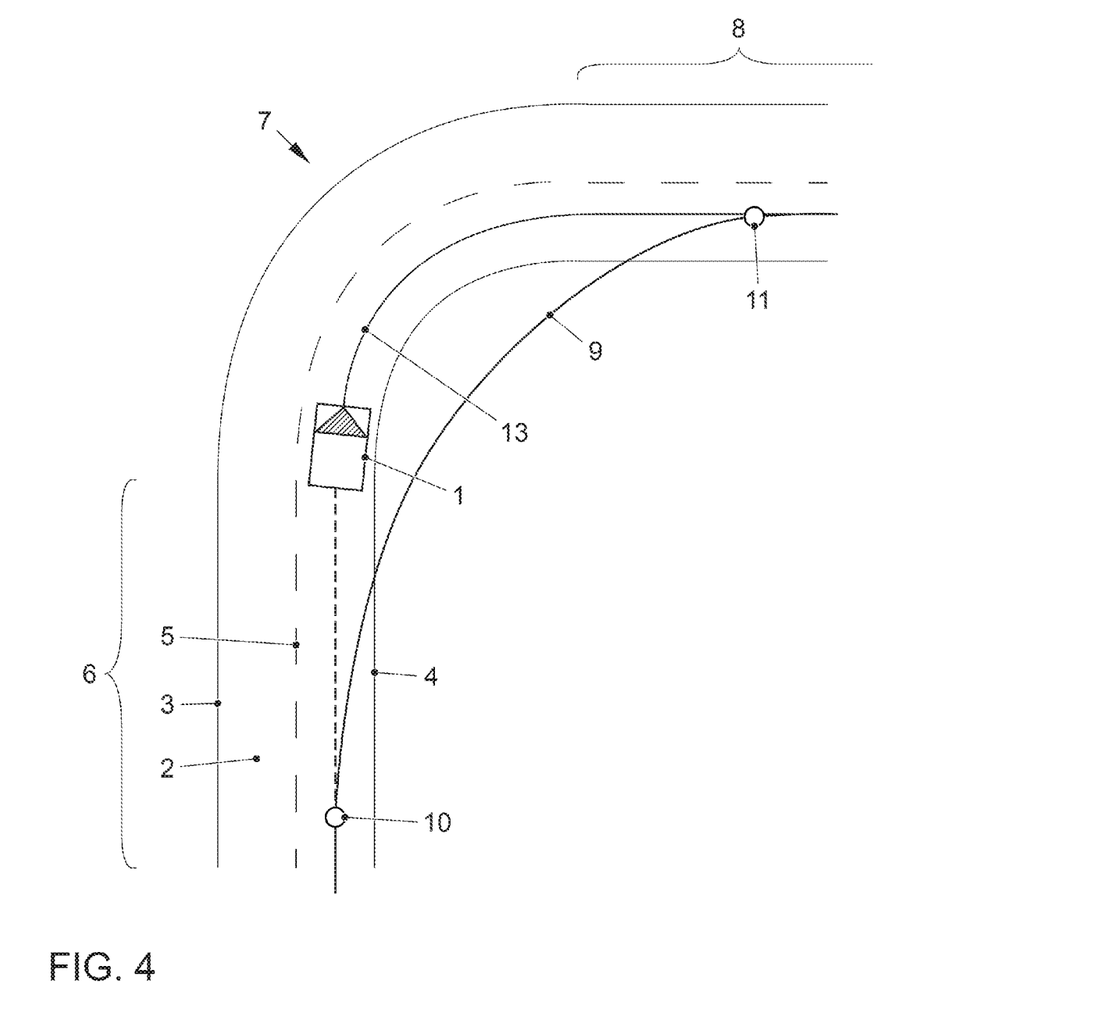
FIG. 4 shows a second correction for the transportation vehicle in the bend.

In FIG. 4, the transportation vehicle has reached the beginning of the bend 7 and the actual curvature of the already traveled path between the starting point 10 of the original clothoid 9 and the current position of the transportation vehicle 1 up to this situation was also shorter than the first corrective clothoid segment 12 shown in FIG. 3. Because the shape preservation of the map material can be assumed and the angle swept through by the curve, in the example here 90°, is correct, the size of the curvature ahead must therefore be corrected further upwards, which leads to the second corrective clothoid 13 of FIG. 4 with the starting and end points 10, 11, wherein the upcoming part of the second corrected clothoid 13 now passes through the bend 7.

Figure 5:
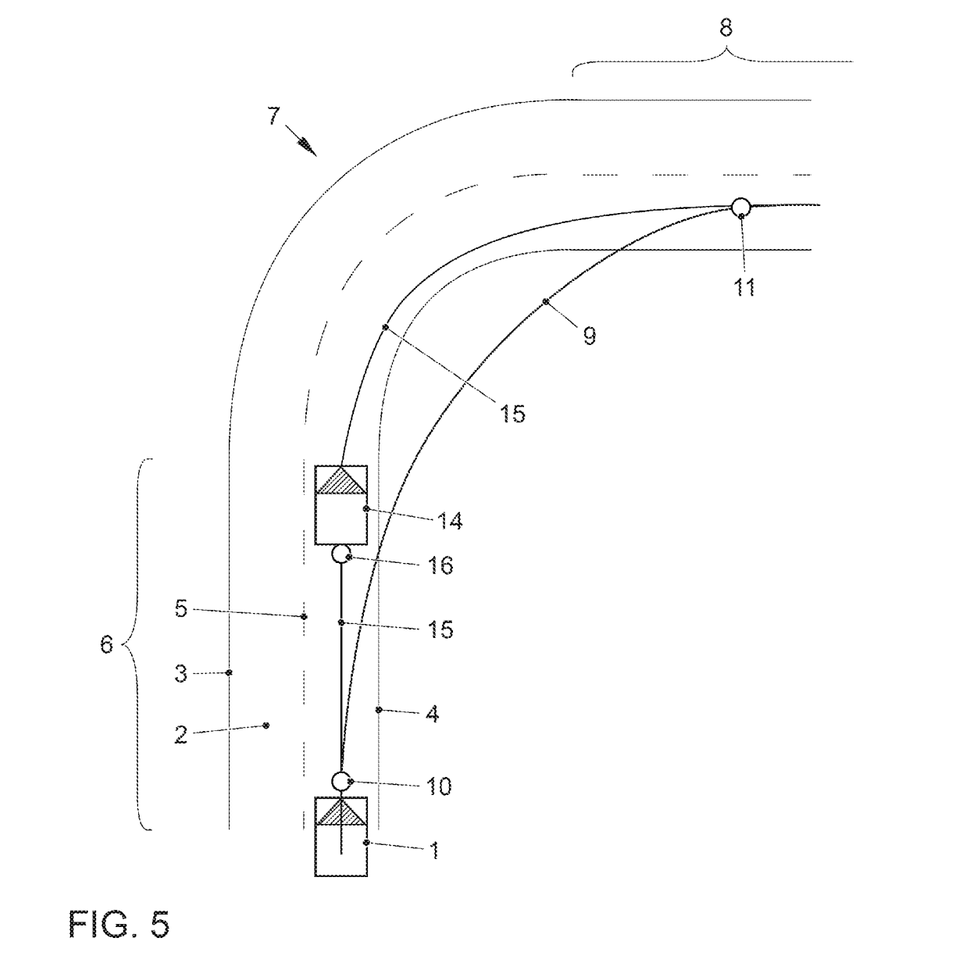
FIG. 5 shows the situation of FIG. 1 with another transportation vehicle traveling ahead.

FIG. 5 shows a traffic situation similar to that of FIG. 2, in which the ego-transportation vehicle 1 is located at the starting point 10 of the original clothoid 9. In contrast to the original situation of FIG. 2, a further transportation vehicle 14 is located on the road 2, which is driving in the same direction ahead of the ego-transportation vehicle 1 and is therefore already on the first section 6 nearer to the start of the bend 7. If the ego-transportation vehicle 1 is equipped with a suitable environmental sensor device, for example, such as a radar, which is usually a component of an ACC assistant, then the ego-transportation vehicle 1 can detect that the path already traveled by the transportation vehicle 14 ahead does not follow the curvature of the approximate original clothoid 9. Thus, in the situation of FIG. 5 it is already possible for the ego-transportation vehicle 1 to perform a correction of the original clothoid 9 and to determine based on the already traveled path of the transportation vehicle 14 ahead, the measured position 16 of the transportation vehicle 14 traveling ahead and the end position 11 of the original clothoid 9, a corrective clothoid 15 which better approximates the course of the road. The corrective clothoid 15 determined based on the position of the transportation vehicle in front 14 does not yet completely follow the course of the road, a situation which can be further corrected by subsequent measurements of the transportation vehicle in front 15. In other words, by tracking a transportation vehicle 15 traveling in front the clothoid 15 shown in FIG. 5, which reproduces the course of the road, can be determined earlier.

Figure 6:
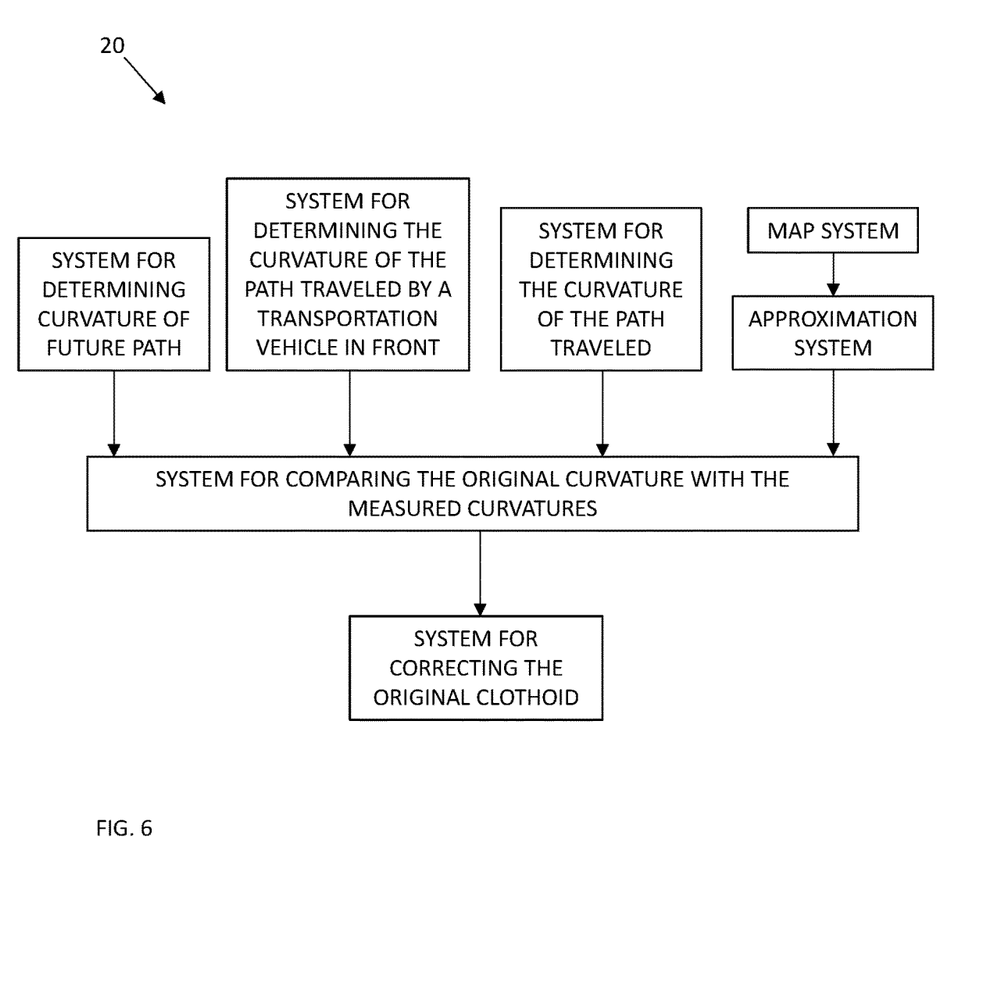
FIG. 6 shows the device for predicting the future course of the road.

FIG. 6 shows a schematic representation of the device for predicting the future course of the road. In this case the device 20 comprises a map system 21, which allows access to a digital map. Usually this map system 21 is part of a navigation system and the map is stored on a DVD, for example. It can also take the form of an online access to a digital map on the internet. In an approximation system 22, the original clothoid 9 is determined for the current road section from the digital map.

In a further system 23, the curvature of the route previously traveled by the ego-transportation vehicle 1 is determined. At the same time, the curvature of the route of a transportation vehicle traveling ahead is optionally determined in a system 24. In another system 25, the curvature of the future driving route ahead of the ego-transportation vehicle 1 is also optionally determined. The measured curvatures and the curvature of the original clothoid 9 are then passed to a system 26 for comparing the original curvature with the measured curvatures, and a system 27 determines a correction of the original clothoid 9 along the route of the ego-transportation vehicle 1 based on the comparison.

LIST OF REFERENCE NUMERALS 1 transportation vehicle—ego—transportation vehicle
2 road
3 left road boundary
4 right road boundary
5 center line
6 first section
7 bend
8 second section
9 original clothoid—predicted course of road
10 starting point
11 end point
12 first correction of the original clothoid
13 second correction of the original clothoid
14 transportation vehicle traveling in front
15 correction to the original clothoid based on the transportation vehicle traveling in front
16 point of departure—position of the transportation vehicle ahead
20 device for predicting the road course
21 map system
22 approximation system
23 system for determining the curvature of the path traveled
24 system for determining the curvature of the path traveled by a transportation vehicle in front
25 system for determining the curvature of the future path
26 system for comparing the original curvature with the measured curvatures
27 system for correcting the original clothoid

The invention claimed is:

1. A device for predicting the future course of a road for a transportation vehicle driving on a road, wherein the road has a first section, a bend and a second section, and the bend is arranged between the first and the second section, the device comprising:

a digital map system;
an approximation system which determines from the map data of the map system an original clothoid segment with starting and endpoints for approximating the course of the road;

a system for determining the actual curvature of the path already traveled by the transportation vehicle after the starting point;

a system for comparing the actual curvature and the predicted curvature of the original clothoid segment; and a system for correcting the original clothoid segment by corrected clothoid segments based on the comparison, wherein an approximated road course derived from a digital map material is determined using the original clothoid segment, wherein the clothoid segment has a starting point on the first section, an end point on the second section, and the clothoid segment sweeps over the angle defined by bend between the first and the second section, and wherein the system for correcting continuously corrects the original clothoid segment by subsequent corrective clothoid segments, wherein each corrective clothoid segment takes into account the curvature of the route actually traveled by the transportation vehicle after the starting point.

2. The device of claim 1, further comprising a system for determining the actual curvature of the path traveled by a transportation vehicle ahead on the future path of the transportation vehicle, wherein the actual curvature of the path traveled by the transportation vehicle ahead is used for comparison with the predicted curvature of the original clothoid segment.

3. The device of claim 1, further comprising a system for determining the curvature of a section of the road ahead of specified length, wherein the actual curvature of the road section ahead is used for comparison with the predicted curvature of the original clothoid segment.

4. A method for predicting the future course of a road for a transportation vehicle driving on a road, wherein the road has a first section, a bend and a second section, and the bend is arranged between the first and the second section, the method comprising:

accessing digital map material using a map system that is part of a navigation system for the transportation vehicle;

determining an approximated road course derived from a digital map material using an original clothoid segment, wherein the clothoid segment has a starting point on the first section, an end point on the second section, and the clothoid segment sweeps over the angle defined by bend between the first and the second section; and continuously correcting the original clothoid segment by subsequent corrective clothoid segments, wherein each corrective clothoid segment takes into account the curvature of the route actually traveled by the transportation vehicle after the starting point, wherein the curvature which is actually travelled after the starting point is determined based on data gathered by sensor systems included in the transportation vehicle so as to provide the correction on a continuous basis.

5. The method of claim 4, wherein the corrective clothoid segments have the starting point and the end point of the original clothoid segment and sweep over the angle specified by the curve between the first section and the second section.

6. The method of claim 4, wherein the curvature of the route already traveled after the starting point is determined and compared with the curvature of the original clothoid segment, and the amount of the curvature located ahead is increased in response to the curvature of the path already traveled being less than the curvature of the original clothoid segment.

7. The method of claim 4, wherein the curvature which is actually traveled after the starting point of the original clothoid is determined based on driving dynamics parameters, from measurements of an environmental sensor device and/or from position determinations of the transportation vehicle.

8. The method of claim 7, wherein, as driving dynamics parameters the yaw rate is determined, an environmental sensor device performs a driving lane recognition and a satellite-based position determination.

9. The method of claim 4, wherein a forward-looking environmental sensor device determines the curvature of a section of road located in front of the current position of the transportation vehicle and the curvature ahead and the end position of the road section ahead are taken into account to determine a corrective clothoid segment.

10. The method of claim 4, wherein the curvature of a path traveled by a transportation vehicle driving ahead and its position after the starting point of the original clothoid segment are taken into account, a corrected clothoid segment is determined.

11. A method for predicting a route of a road in an ACC system and/or a lateral guidance assistance system of a transportation vehicle by predicting a future course of a road for a transportation vehicle driving on the road, wherein the road has a first section, a bend and a second section, and the bend is arranged between the first and the second section wherein an approximated road course derived from a digital map material is determined using an original clothoid segment, wherein the clothoid segment has a starting point on the first section, an end point on the second section, and the clothoid segment sweeps over the angle defined by bend between the first and the second section, and wherein the system for correcting continuously corrects the original clothoid segment by subsequent corrective clothoid segments, wherein each corrective clothoid segment takes into account the curvature of the route actually traveled by the transportation vehicle after the starting point.

12. The method of claim 10, wherein the corrective clothoid segments have the starting point and the end point of the original clothoid segment and sweep over the angle specified by the curve between the first section and the second section.

13. The method of claim 10, wherein the curvature of the route already traveled after the starting point is determined and compared with the curvature of the original clothoid segment, and the amount of the curvature located ahead is increased in response to the curvature of the path already traveled being less than the curvature of the original clothoid segment.

14. The method of claim 10, wherein the curvature which is actually traveled after the starting point of the original clothoid is determined based on driving dynamics parameters, from measurements of an environmental sensor device and/or from position determinations of the transportation vehicle.

15. The method of claim 14, wherein, as driving dynamics parameters the yaw rate is determined, an environmental sensor device performs a driving lane recognition and a satellite-based position determination.

16. The method of claim 10, wherein a forward-looking environmental sensor device determines the curvature of a section of road located in front of the current position of the transportation vehicle and the curvature ahead and the end position of the road section ahead are taken into account to determine a corrective clothoid segment.

17. The method of claim 10, wherein the curvature of a path traveled by a transportation vehicle driving ahead and its position after the starting point of the original clothoid segment are taken into account, a corrected clothoid segment is determined.

* * * * *